Feb. 11, 1958 P. J. H. JANSSEN ET AL 2,823,308

FM RECEIVER ARRANGEMENT

Filed June 3, 1954

INVENTOR.

Peter Johannes Hubertus Janssen
BY Wouter Smeulers

Fred M Vogel
AGENT 2,823,308

FM RECEIVER ARRANGEMENT

Peter Johannes Hubertus Janssen and Wouter Smeulers, Eindhoven, Netherlands, assignors, by mesne assignments, to North American Philips Company, Inc., New York, N. Y., a corporation of Delaware Application June 3, 1954, Serial No. 434,224

Claims priority, application Belgium June 5, 1953

4 Claims. (Cl. 250—27)

The invention relates to an FM receiver arrangement containing a ratio detector comprising an RC filter for rejecting the undesired amplitude modulation of a received FM oscillation and an output filter across which the frequency demodulated signal is generated.

It is found that in such a receiver arrangement pulse disturbances, for example, electrical noise disturbances of automobile ignition coils, penetrate undesirably into the demodulated signal, which according to a theory underlying the invention is based on the fact that, if the disturbance pulse becomes approximately equal to the received oscillation, a resultant oscillation is produced exhibiting a very great instantaneous frequency shift, which oscillation consequently after frequency demodulation gives rise to an undesirable pulsatory disturbance in the demodulated signal.

The object of the invention is to reduce this disturbance; according to the invention an FM receiver arrangement is characterized in that the said demodulated signal is passed for the purpose of rejecting impulse disturbances through the series combination of two rectifiers connected with reversed conductivity with respect to one another, which in the absence of pulse disturbances are kept conductive by currents derived from the said RC filter with the aid of blocking resistors, whilst, if the slope of the edges of the demodulated signal due to pulse disturbances is higher than corresponds with the highest signal frequency required to be transmitted, one of the two rectifiers becomes non-conductive.

An arrangement for rejecting pulse disturbances in the case of amplitude modulation reception, which arrangement contains the series combination of two rectifiers connected with asymmetric conductivity with respect to each other is known per se. A simple effective arrangement is obtained in that according to the invention such an arrangement is used in combination with a ratio detector, the voltage across the first-mentioned RC-filter acting as a current source for the said rectifiers.

Figure 1:
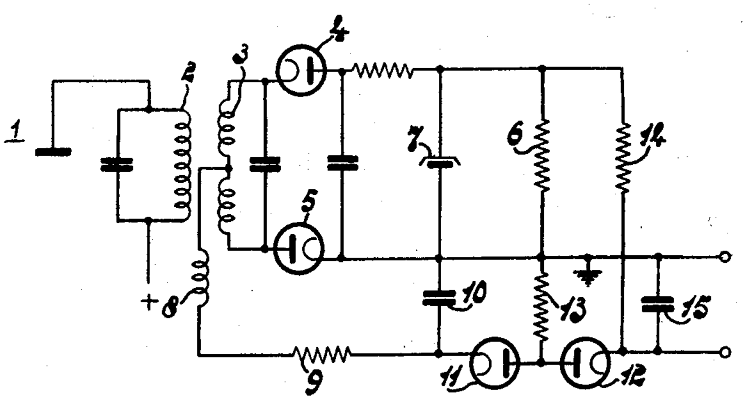
Figures 2, 3:
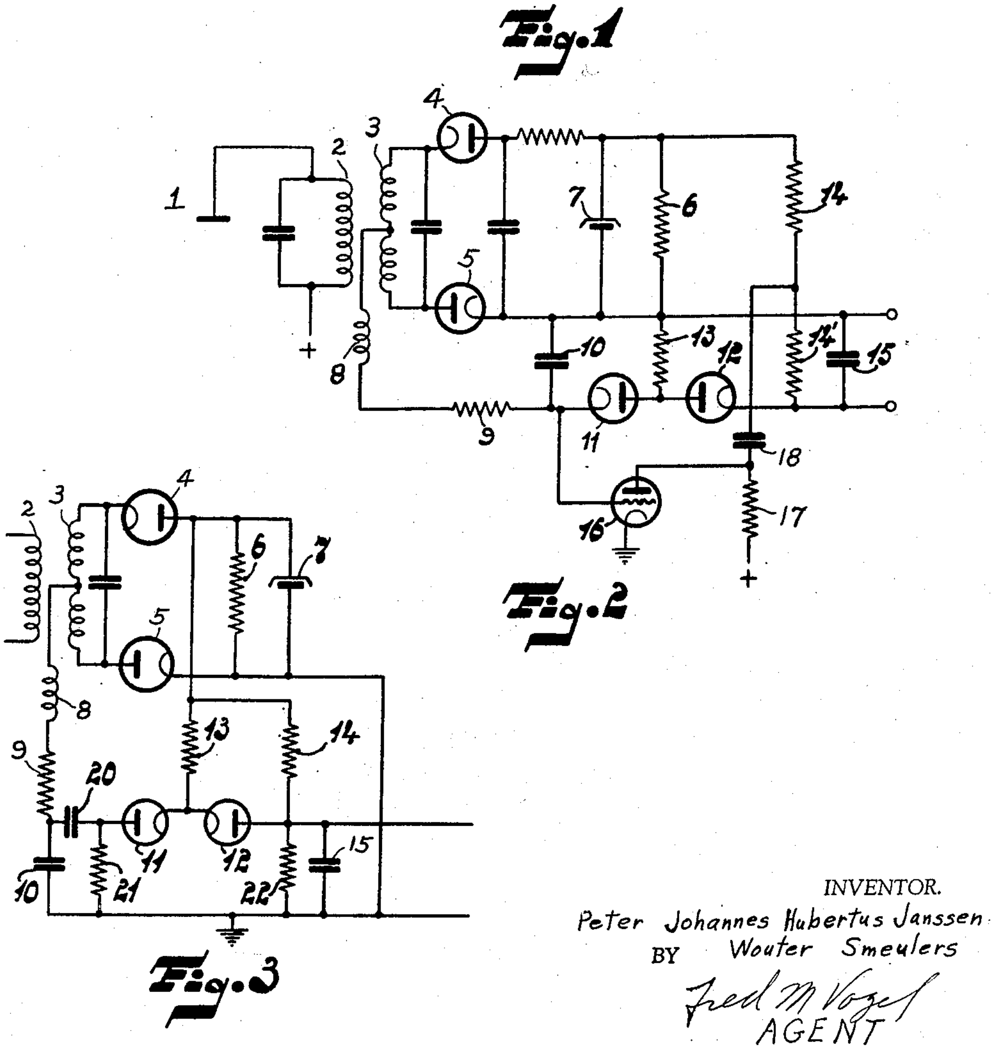

The invention will now be explained with reference to the accompanying drawing in which Fig. 1 is a diagram of one embodiment thereof and Figs. 2 and 3 show a modification of an arrangement of the kind shown in Fig. 1.

In Fig. 1, an input circuit 2 is connected to receive frequency-modulated oscillations from a conventional intermediate-frequency amplifier stage 1 and is coupled to a tapped secondary circuit 3. The cathode of a rectifier 4 is connected to an end of the secondary circuit 3, and the anode of a rectifier 5 is connected to the other end of the secondary circuit 3. An RC filter, comprising a connected across the remaining electrodes of the recti- resistor 6 and a capacitor 7 connected in parallel, is connected across the remaining electrodes of the rectifiers 4 and 5. The cathode of the rectifier 5 is connected to electrical ground. A coupling coil 8 and a resistor 9 are connected in series between the top of the secondary circuit 3 and the cathode of a rectifier 11. A capacitor 10 is connected between the cathode of rectifier 11 and electrical ground, and a resistor 13 is connected between the anode of rectifier 11 and electrical ground. The anode of a rectifier 12 is connected to the anode of the rectifier 11. A resistor 14 is connected between the cathode of rectifier 12 and the anode circuit of the rectifier 4, and an output capacitor 15 is connected between the cathode of rectifier 12 and electrical ground. Output terminals are connected to the respective terminals of the output capacitor 15. This circuit, with the exception of the rectifiers 11 and 12, the resistors 13 and 14, and capacitor 15, is a conventional ratio detector circuit in which the demodulated signal appears across the capacitor 10 and in which the RC filter 6, 7 has a relatively high time-constant so as to cause rejection of undesired amplitude modulation of the received oscillation.

In accordance with the present invention, the rectifiers 11 and 12 are provided and are connected as has been described, in order to cause rejection of undesired pulse disturbances which may occur in the demodulated signal. The demodulated signal passes from the capacitor 10 to the output capacitor 15, through the series combination of the rectifiers 11 and 12 which are connected in opposite directions of conductivity and which are normally maintained conductive by currents derived from the voltage at the RC filter 6, 7, and applied to the rectifiers 11 and 12 through the resistors 13 and 14.

If, at the capacitor 10, a negative disturbance pulse is superposed on the demodulated signal, the rectifier 11 will pass the signal comprising this pulse unimpeded; the rectifier 12, however, becomes non-conductive (cut off) due to the fact that the voltage across the capacitor 15 is not capable of following a signal exhibiting such a pulsatory edge slope rapidly enough, when the current passing through the resistor 14 is so weak. Conversely, when positive disturbance pulses occur, the rectifier 12 will similarly remain conductive, but the rectifier 11 will be cut off. As a result the disturbance pulses will occur to only a slight extent in the signal at the capacitor 15.

In order to obtain a symmetrical disturbance rejection for the positive and the negative half of the demodulated signal the resistors 13 and 14 are adjusted so that in the absence of modulation and of disturbances the currents passing through the rectifiers 11 and 12 are approximately equal. In a preferred embodiment the values of these currents were, for example, 10 μa. at a value of the resistor 13 of 330K ohms and of the resistor 14 of 680K ohms. The values of the capacitors 7, 10 and 15 were 10 μf., 330 μμf. and 820 μμf., respectively and those of the resistors 6 and 9 were 15K ohms and 47 ohms respectively.

The circuit of Fig. 2 is the same as in Fig. 1 except for the following additional elements. A phase-reversing amplifier comprises a tube 16 having a grid connected to the cathode of the rectifier 11. A load resistor 17 is connected between the anode of tube 16 and a source of positive-potential operating voltage. A resistor 14 is interposed between the cathode of rectifier 12 and an end of resistor 14, and a coupling capacitor 18 is connected between the anode of tube 16 and the junction of resistors 14 and 14'.

According to the arrangement shown in Fig. 2 an additional disturbance rejection is obtainable, because the signal produced across the capacitor 10 is also set up, for example through the phase-reversing stage 16, at approximately the same amplitude but in phase opposition in the direct current circuit 13—6—14—14' of the second rectifier 12. This will permit the current supplied to the capacitor 15 during the occurrence of a disturbance pulse to be adjusted exactly to the value zero, with the result that the disturbance energy is further reduced.

In order to avoid the disadvantage that the direct current flowing through the circuit 8—9, which is found to vary when the receiver is tuned, results in distortion of the FM-reception, Fig. 3 shows a modification of the circuit arrangement shown in Fig. 1. In Fig. 3, a ratio detector circuit is connected in essentially the same manner as shown in Fig. 1 and comprises the coupled circuits 2, 3; rectifiers 4, 5; an RC filter 6, 7; coupling coil 8; resistor 9; and a capacitor 10. The circuit for reducing pulse disturbances, in this modification of the invention, comprises the rectifiers 11 and 12 connected cathode-to-cathode, the anode of rectifier 11 being coupled via a capacitor 20 to the junction of resistor 9 and capacitor 10 and being connected to ground via a resistor 21. The resistor 13 is connected between the junction of the cathodes of the rectifiers 11, 12 and the anode of rectifier 4. The resistor 14 is connected between the anodes of the rectifiers 4 and 12. A resistor 22 and the output capacitor 15 are connected in parallel between the anode of rectifier 12 and ground. The demodulated signal produced across the capacitor 10 is supplied via the blocking capacitor 20 of value, for example, 22,000 $\mu\mu$f., to the series combination of the two rectifiers 11 and 12 the polarity of which, if required, may in this case be reversed. The potential produced across the RC-filter 6—7 is again supplied through blocking resistors 13 and 14 of value, for example, 680K ohms and 2.7M ohms respectively to the said rectifiers 11 and 12 in order to maintain the said rectifiers conductive in the absence of pulse disturbances, whilst the resistors 21 and 22 each having a value of, for example, 330K ohms serve to close the direct current circuit of the rectifiers 11 and 12. Thus the important advantage is retained that the currents supplied by the RC-filter 6—7 to the rectifiers 11 and 12 vary to the same extent on variation of the amplitude of the received FM-oscillation, with the result that the disturbance rejection sets in at the same edge slope of the demodulated signal.

What is claimed is:

1. A frequency-modulation receiver comprising a ratio detector circuit having an input impedance, means for producing frequency-modulated signals in said input impedance, a first rectifier having an anode connected to an end of said input impedance, a second rectifier having a cathode connected to the other end of said input impedance, a parallel combination of a resistor and a capacitor connected between the remaining electrodes of said rectifiers, said parallel combination having a relatively large time constant so as to cause rejection of any amplitude modulation of said signals, a pair of rectifiers, means connecting an electrode of one of said pair of rectifiers to the corresponding electrode of the other of said pair of rectifiers, a low-pass filter connected between the remaining electrode of one of said pair of rectifiers and a point on said input impedance, a resistor connected between said corresponding electrodes and one end of said parallel combination, and a resistor connected between the remaining electrode of the other one of said pair of rectifiers and the other end of said parallel combination.

2. A receiver as claimed in claim 1, in which the two last-named resistors have values to cause equal currents to flow in the rectifiers of said pair in the absence of modulation of said signals.

3. A receiver as claimed in claim 1, including a phase-reversing circuit connected between the junction of said low-pass filter and said remaining electrode and a point on the last-named said resistor.

4. A receiver as claimed in claim 1, including a blocking capacitor interposed between said low-pass filter and said remaining electrode of said one of said pair of rectifiers.

References Cited in the file of this patent

UNITED STATES PATENTS

| | | |
|---|---|---|
| 2,265,883 | Applegarth | Dec. 9, 1941 |
| 2,281,395 | Travis | Apr. 28, 1942 |
| 2,519,890 | Crosby | Aug. 22, 1950 |

OTHER REFERENCES

Abstract, application No. 537,340, 629 O. G. 830, Dec. 20, 1949.